US012774657B2

(12) United States Patent
Malkamäki et al.

(10) Patent No.: US 12,774,657 B2
(45) Date of Patent: Oct. 27, 2026

(54) TURBINE WHEEL, GAS TURBINE, AND METHOD FOR COOLING A TURBINE WHEEL

(71) Applicant: AURELIA TURBINES OY, Lappeenranta (FI)

(72) Inventors: Matti Malkamäki, Kokkola (FI); Toni Hartikainen, Lappeenranta (FI)

(73) Assignee: AURELIA TURBINES OY, Lappeenranta (FI)

( * ) Notice: Subject to any disclaimer, the term of this patent is extended or adjusted under 35 U.S.C. 154(b) by 0 days.

(21) Appl. No.: 18/868,346

(22) PCT Filed: May 25, 2023

(86) PCT No.: PCT/FI2023/050295
§ 371 (c)(1),
(2) Date: Nov. 22, 2024

(87) PCT Pub. No.: WO2023/227833
PCT Pub. Date: Nov. 30, 2023

(65) Prior Publication Data

US 2025/0327405 A1 Oct. 23, 2025

(30) Foreign Application Priority Data

May 27, 2022 (EP) .................................... 22175786

(51) Int. Cl.
*F01D 5/04* (2006.01)
*F01D 11/02* (2006.01)

(52) U.S. Cl.
CPC .............. *F01D 5/046* (2013.01); *F01D 11/02* (2013.01); *F05D 2240/55* (2013.01); *F05D 2260/20* (2013.01)

(58) Field of Classification Search
CPC .......... F01D 5/046; F01D 5/048; F01D 5/085; F01D 5/087; F01D 25/08; F01D 25/12;
(Continued)

(56) References Cited

U.S. PATENT DOCUMENTS 2,283,176 A * 5/1942 Birmann .................. F02C 7/12 417/406
2,382,564 A * 8/1945 Haverstick ............. F01D 5/046 60/39.17

(Continued)

FOREIGN PATENT DOCUMENTS

| | | | |
|---|---|---|---|
| EP | 2604825 | A2 | 6/2013 |
| GB | 673393 | A | 6/1952 |
| WO | 2020/241133 | A1 | 3/2020 |

OTHER PUBLICATIONS

International Preliminary Report on Patentability, PCT/FI2023/050295, mailed Oct. 7, 2024.

(Continued)

*Primary Examiner* — Elton K Wong
(74) *Attorney, Agent, or Firm* — Thomas | Horstemeyer, LLP

(57) ABSTRACT

A turbine wheel (100), a gas turbine (200) and a method for cooling a turbine wheel (100) are presented. A turbine wheel (100) has a rotation axis (5), a first side (110) and a second side (120), said sides (110, 120) being opposite sides in a direction of the rotation axis (5). The turbine wheel (100) comprises a first opening (10) at the first side (110) and a number of second openings (20) at the second side (120), wherein the first opening (10) is in a fluid communication, via at least one fluid channel (15), with the at least one of the number of second openings (20), the at least one fluid channel (15) comprising at least one curved portion, and a shaft position (12) at the first side (110) for attaching a shaft (Continued)

(160), wherein the first opening (10) is arranged to a different position with respect to the shaft position (12).

14 Claims, 12 Drawing Sheets

(58) Field of Classification Search
CPC .. F01D 11/02; F05D 2260/20; F05D 2230/30; F05D 2230/31; F05D 2240/55
See application file for complete search history.

(56) References Cited

U.S. PATENT DOCUMENTS 2,577,179 A 12/1951 Buchi
3,582,232 A 6/1971 Okapuu
4,221,540 A 9/1980 Savonuzzi
6,257,834 B1 * 7/2001 Bremer ................. F04D 29/584 417/406
2015/0233299 A1 * 8/2015 Chekansky ............... F02C 6/12 60/605.1
2018/0010483 A1 * 1/2018 Beach ........................ F01D 9/02
2020/0300115 A1 * 9/2020 Aurahs .................... F01D 25/14
2023/0003131 A1 * 1/2023 Dai .......................... F01D 5/186

OTHER PUBLICATIONS

International Search Report and Written Opinion, PCT/FI2023/050295, Sep. 9, 2023.
Applicant's Response to Written Opinion, PCT/FI20203/050295, filed Mar. 1, 2024.

* cited by examiner

TURBINE WHEEL, GAS TURBINE, AND METHOD FOR COOLING A TURBINE WHEEL

CLAIM OF PRIORITY TO RELATED APPLICATION

This application is the 35 U.S.C. § 371 national stage application of PCT Application No. PCT/FI2023/050295, filed May 25, 2023, where the PCT claims priority to EP patent application No. 22175786.7 filed on May 27, 2022, the entire contents of which are hereby incorporated herein by reference.

FIELD OF THE INVENTION

The present invention relates in general to gas turbines. In particular, however, not exclusively, the present invention concerns turbine wheels and cooling arrangements thereof and methods therefor.

BACKGROUND

Turbine wheels are widely used in turbochargers and gas turbines for producing electrical and thermal energy. Known turbine wheels are manufactured by casting and then machined to obtain the final product. This is a well-known process for manufacturing solid metal turbine wheels.

It is known that the efficiency of a gas turbine can be made higher by increasing the inlet temperature of the turbine. In known solutions this is done by utilizing materials in the turbine wheels which can withstand higher temperatures.

A drawback in the known solutions is that the turbine wheels need machining after casting and that the casting tends to be inaccurate to produces small details directly into the wheel. Furthermore, the materials withstanding higher temperatures than conventional materials tend to be expensive and, in some cases, unavailable. Thus, there is still a need to develop turbine wheels which can withstand higher temperature and, thus gas turbines having higher efficiencies through the use of higher inlet temperature of the turbines thereof.

SUMMARY

An objective of the present invention is to provide a turbine wheel, a gas turbine, and a method for cooling a turbine wheel of a gas turbine. Another objective of the present invention is to provide a turbine wheel which can withstand higher temperatures to be used in the turbine.

The objectives of the invention are reached by a turbine wheel, a gas turbine, and a method for cooling a turbine wheel as defined by the respective independent claims.

According to a first aspect, a turbine wheel is provided. The turbine wheel has a rotation axis, which may be imaginary or physical, a first side and a second side, said sides being opposite sides in a direction of the rotation axis. The turbine wheel comprises a first opening at the first side and a number of second openings at the second side, wherein the first opening is in a fluid communication with the at least one of the number of second openings, such as through a fluid channel or channels extending between the first and the second opening or openings, and a shaft position at the first side, wherein the first opening is arranged to a different position with respect to the shaft position. The shaft position is preferably adapted for attaching thereto a shaft, such as of a gas turbine.

The fluid communication is arranged via the at least one fluid channel extending between the first and the second opening(s). At least one of the fluid channels, preferably, comprises at least one curved portion, such as, optionally, in an intermediate portion of the wheel between the leading and trailing edges.

In addition, optionally, the at least one curved portion may have a shape conforming with the shape of the edge of the blade of the wheel.

The division between the first side and the second side can be made, for example, at the centre point of the leading edge of the turbine wheel.

The fluid communication or the fluid channels may preferably be arranged through at least part of the turbine wheel, that is, extending inside the body of the turbine wheel.

Means for the fluid communication or the fluid channel may exhibit any shape. For example, the cross-section of the channel may be substantially constant at least in most parts of the channel. On the other hand, the turbine wheel may be made substantially hollow, or a space or a volume with an irregular shape may have been arranged into the turbine wheel which functions to provide the fluid communication or the fluid channel. Still further, the fluid communication or the fluid channel may comprise several parallel channels or conduits.

The first opening may be arranged unaligned with respect to the shaft position in the direction of the rotation axis.

The shaft position may define a shaft area that is perpendicular with respect to the rotation axis, wherein the first opening may be arranged unaligned with respect to the shaft area.

The turbine wheel may comprise a first surface at the first side being substantially perpendicular with respect to the rotation axis, wherein the first opening is arranged to the first surface.

The turbine wheel may comprise a shaft portion extending in the direction of the rotation axis at the first side and away from the second side, the shaft portion defining a side surface, and the shaft position and/or the shaft area. Furthermore, in some embodiments, the first opening is on the side surface of the shaft portion. Therefore, the first opening on the side surface is at the different position with respect to the shaft position, that is between the shaft position and/or the shaft area and the rest of the turbine wheel.

The turbine wheel may comprise a plurality of first openings at the first side, each one of which being in fluid communication with at least one of the number of second openings. The first openings may be only on the first surface or only on the side surface of the shaft portion, or on both of them.

The plurality of first openings may be arranged evenly, or having the same spaces there between, around the shaft position.

In various embodiments, the second opening or openings may be arranged on the second side of the turbine wheel.

The turbine wheel may have been manufactured by an additive manufacturing method or by 3D printing, or by subtractive methods including, for example, milling and drilling, such as the wheel and/or the fluid communication or the fluid channel(s).

The turbine wheel may be a single-piece turbine wheel, especially when manufactured by a 3D printing method, allowing fluid channel(s) with curved portion(s) to be provided during the printing process.

According to a second aspect, a gas turbine is provided. The gas turbine comprises a turbine wheel according to the first aspect, such as, operating as a turbine wheel of a high and/or low-pressure turbine, and further at least one second fluid channel arranged for providing cooling fluid to be supplied to the first opening or openings from a fluid source. The fluid source may be a compressor of the gas turbine.

An end of the second fluid channel may be arranged to a space at the first side of the turbine wheel, the space being between the turbine wheel and a body part of the turbine, such as the turbine backplate, wherein the turbine wheel is configured to be rotated with respect to the body part, and wherein the first opening is arranged to face the space.

The gas turbine may comprise a shaft arranged to the shaft position of the turbine wheel and a compressor arranged on the shaft.

A body part may be arranged between the compressor and the turbine wheel, and the shaft may be arranged to be rotated with respect to the body part. The second fluid channel may be arranged between the compressor and the space along a second space between the shaft and the body part.

The second space may comprise a sealing, such as a labyrinth seal.

The gas turbine may comprise a controllable valve in the second fluid channel for controlling a flow of the cooling fluid.

The flow of the cooling fluid may be controlled, for example, based on a determined, such as directly measured, or indirectly estimated (such as by a mathematical model or an algorithm executed by a processing unit, such as of a controller of the gas turbine) inlet temperature of the turbine wheel. In some cases, the flow of cooling fluid may even be stopped, if the inlet temperature of the turbine or turbines (high and low pressure) is lower than an inlet temperature threshold value(s).

According to a third aspect, a method for providing cooling to a turbine wheel of a gas turbine is provided. The method comprises:

- obtaining a turbine wheel having a rotation axis, a first side and a second side, said sides being opposite sides in a direction of the rotation axis, and comprising a first opening at the first side and a number of second openings at the second side, wherein the first opening is in a fluid communication, via at least one fluid channel, with the at least one of the number of second openings, the at least one fluid channel comprising at least one curved portion, and a shaft position at the first side for attaching a shaft, the first opening being arranged to a different position with respect to the shaft position, and
- arranging at least one second fluid channel for providing cooling fluid to be supplied to a first opening or openings from a fluid source.

The fluid source may preferably comprise a compressor of the turbine.

The present invention provides a turbine wheel, a gas turbine and a method for cooling a turbine wheel of a gas turbine. The present invention provides advantages over known solutions such that the space between the turbine wheel and the body part of the gas turbine can be utilized to provide cooling fluid into the turbine wheel via the first opening or openings facing the space at the first side of the turbine wheel and, thus, the wheel can withstand high temperatures utilized in the turbine.

Various other advantages will become clear to a skilled person based on the following detailed description.

The expression "a number of" may herein refer to any positive integer starting from one (1).

The expression "a plurality of" may refer to any positive integer starting from two (2), respectively.

The terms "first", "second" and "third" are herein used to distinguish one element from another element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also un-recited features. The features recited in dependent claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1A:
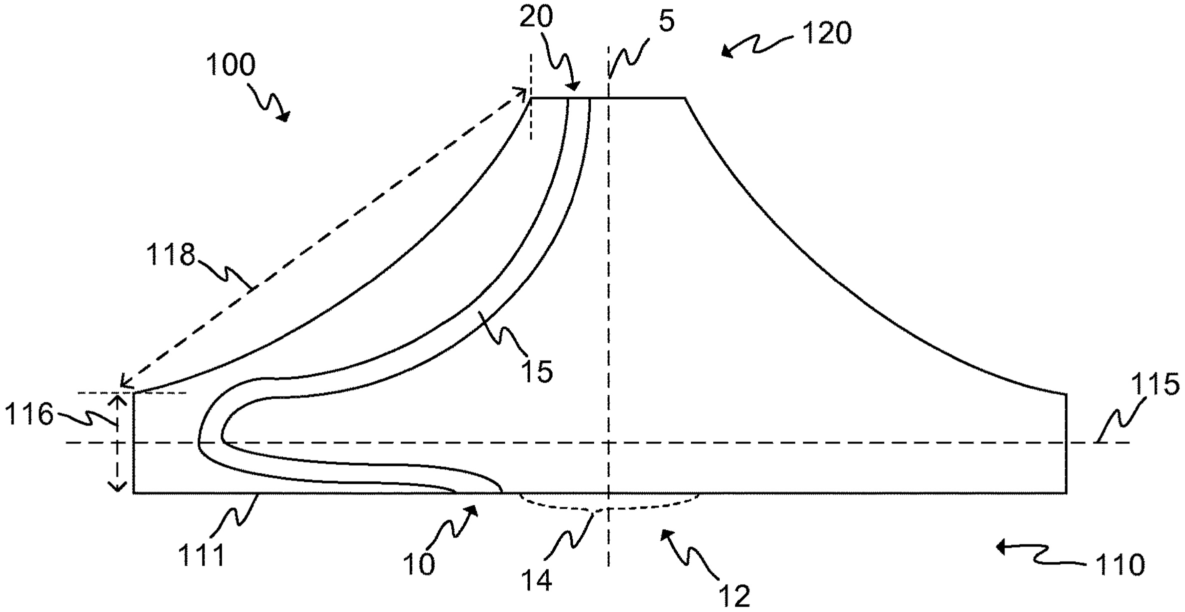
FIGS. 1A and 1B illustrate schematically a turbine wheel according to an embodiment of the present invention.
Figure 1B:
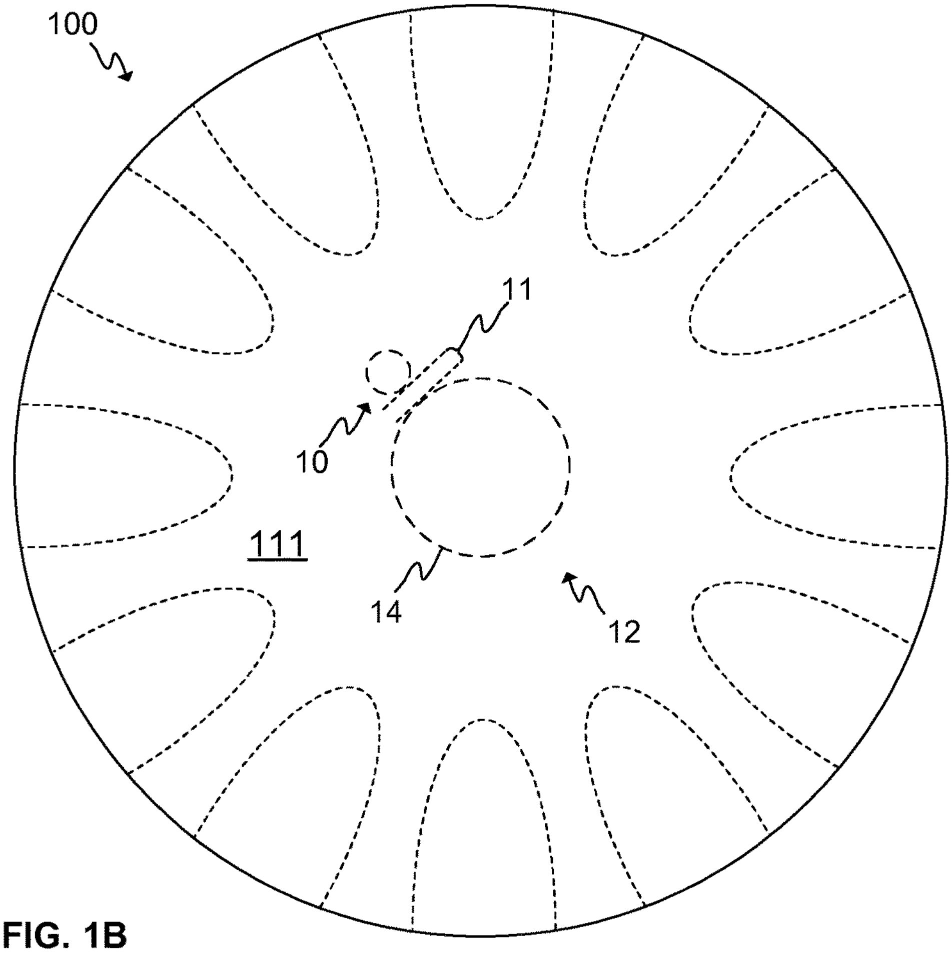

FIGS. 1A and 1B illustrate schematically a turbine wheel 100 according to an embodiment of the present invention. The turbine wheel 100 may have or define a rotation axis 5, such as an imaginary axis or a physical axis. The turbine wheel 100 may also have or define a first side 110 and a second side 120, wherein said sides 110, 120 are opposite sides in a direction of the rotation axis 5. Preferably, the first side 110 may be the inlet side of the turbine wheel 100 and the second side 120 the outlet side of the turbine wheel 100. The division between the first side 110 and the second side 120 can be made, for example, as shown in FIG. 1A with a division line 115 (or division plane 115) which is at the centre point of the leading edge of the turbine wheel 100, that is in the direction of the height 116 of the leading edge. An intermediate portion 118 of the turbine wheel 100 is shown between the leading edge and the trailing edge of the wheel 100.

FIG. 1A illustrates the turbine wheel 100 as a cross-sectional side view. FIG. 1B illustrates the turbine wheel 100 from a first side 110, or below if looking at FIG. 1A. The turbine wheel 100 may be substantially round when looking from the first side 110 or may have, for example, certain shapes at the peripheral portion of the wheel 100 such as shown in FIG. 1B with dashed parabolas.

The turbine wheel 100 may comprise a first opening 10 or a plurality of first openings 10 at the first side 110, a number of second openings 20 and a fluid communication between the first 10 and at least one second opening 20, such as a fluid channel 15 extending between the first opening 10 and at least one of the number of second openings 20. The fluid channel 15 may comprise at least one curved portion, as is visible in FIG. 1A and various other figures herein. Especially, the curved portion may have a shape that conforms with the shape of the edge of the blades, as shown. The curved portion allows providing the fluid channel, for example, closer to the edge of the blades or other portion of the wheel, thus improving the cooling effect compared to a straight channel extending adjacent to the blade edge. Curved portions may also be used to improve flow of cooling fluid.

The fluid channel 15 may preferably extend inside the turbine wheel 100 for providing cooling of the wheel 100 from inside when cooling fluid, such as air or cooling liquid, is being provided into the channel 15. The fluid channel 15 is shown in FIG. 1A to extend along and near the edge of the blades of the turbine wheel 100, however, the fluid channel 15 may essentially be arranged to extend along any path between the first opening 10 or openings 10 and at least one of the second openings 20. The shape of the fluid channel 15, as is visible in FIG. 1A, may conform with the shape of the edge of the blades. The fluid channel 15 may, thus, comprise at least one curved portion, preferably, in the intermediate portion 118 of the wheel 100. Alternatively, the shape of the fluid channel 15 may be completely curved. The fluid channel 15 may advantageously be arranged such that when cooling fluid, such as air, is introduced into the fluid channel 15, the turbine wheel 100 is being cooled at its most critical parts, such as the ones exhibiting highest temperatures during use of the turbine wheel 100, for example, in a gas turbine.

Furthermore, the turbine wheel 100 may comprise a shaft position 12 at the first side 110. The shaft position 12 refers herein to a position into which the shaft or axis of the turbine wheel 12 is attached, to be attached or arranged into. The shaft or axis may be an integrated part of the wheel 100 or may be attached, for example, by welding, or by a screw or a screw-type coupling or a bolt 25 (see FIGS. 4A and 4B). Furthermore, the shaft or axis may be arranged into a volume inside the wheel 100 being arranged at the shaft position 12. Preferably, the shaft or axis is arranged in fixed manner with respect to the wheel 100, however, it may also be arranged such as it may rotate with respect to the wheel 100, such as by bearings or simply being completely separate from the wheel 100.

Still further, the turbine wheel 100 may comprise the first opening 10 being arranged to a different position with respect to the shaft position 12. The different position may mean that the first opening 10 is arranged unaligned with respect to the shaft position 12 in the direction of the rotation axis 5. An example of the unalignment is illustrated in FIG. 1B with a distance 11 perpendicular with respect to the direction of the rotation axis 5. The cooling fluid may, therefore, be introduced or directed or injected into the turbine wheel 100 via the first opening 10 or openings 10 in a convenient way and close to the turbine wheel 100 as becomes evident from the various embodiments of the present invention described herein.

In preferable embodiments, the second opening(s) 20 at the second side 120 may be at the intermediate portion 118 and/or the trailing edge and/or aligned with the shaft position 12 (or the shaft area 14) in the direction of the rotation axis 5. Most preferably, the second opening(s) 20 at the second side 120 may be at the trailing edge and/or aligned with the shaft position 12 (or the shaft area 14) in the direction of the rotation axis 5 so as not the interfere the fluid flow at the leading edge and the intermediate portion 118.

Alternatively or in addition, the shaft position 12 may define a shaft area 14 that is perpendicular with respect to the rotation axis 5, wherein the first opening 10 is arranged unaligned with respect to the shaft area 14. The shaft area 14 refers herein to the area inside the edge of said area 14, however, not including the edge. The first opening 10 may be arranged substantially into the same plane with respect to the shaft area 14 or another plane being parallel or perpendicular or anything therebetween.

In various embodiments, the unalignment means that when looking at the turbine wheel 100 from the first side 110 along the direction of the rotation axis 5, the shaft position 12 or the shaft area 14 does not overlap with the area defined by the first opening 10 or openings 10.

Furthermore, the turbine wheel 100 may comprise or define a first surface 111 at the first side 110 being substantially perpendicular with respect to the rotation axis 5. According to various embodiments, the first opening 10 may then be arranged to the first surface 111. The first surface 111 may be mostly essentially planar, however, not necessarily. There may, alternatively, be local non-planar shapes or the shape of the first surface 111 may have a curved or the like overall shape. These remarks about the shape of the first surface 111 apply also to FIGS. 2A-11.

Figure 2A:
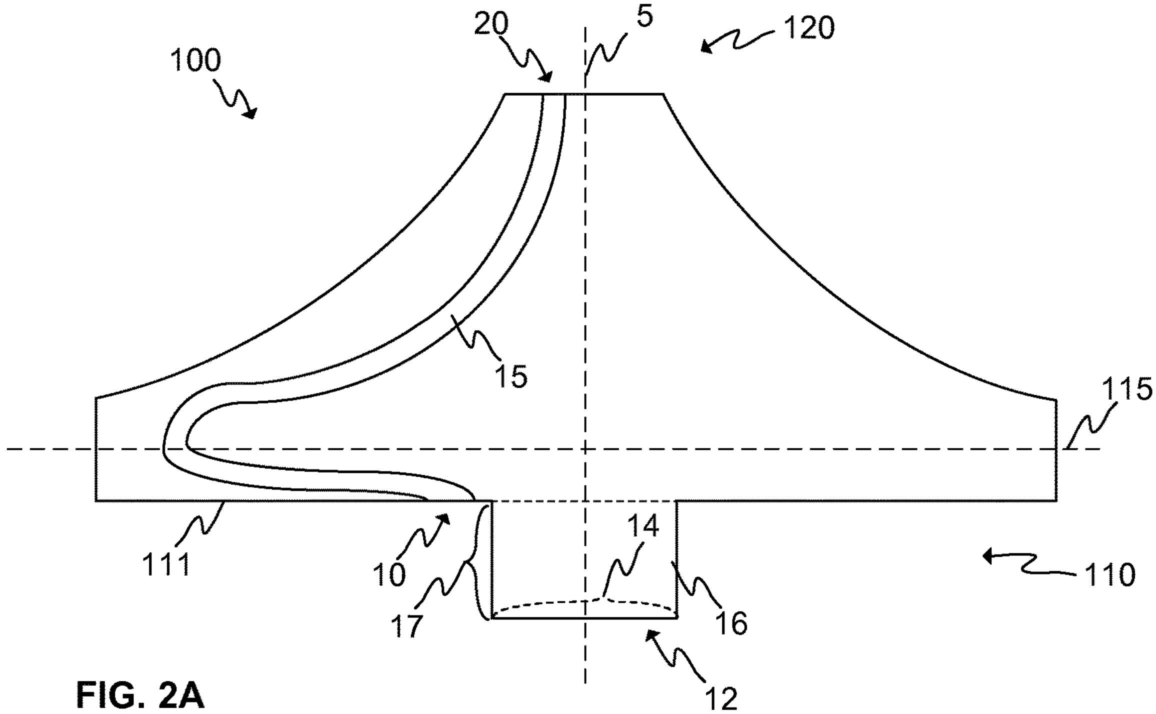
FIGS. 2A and 2B illustrate schematically a turbine wheel according to an embodiment of the present invention.
Figure 2B:
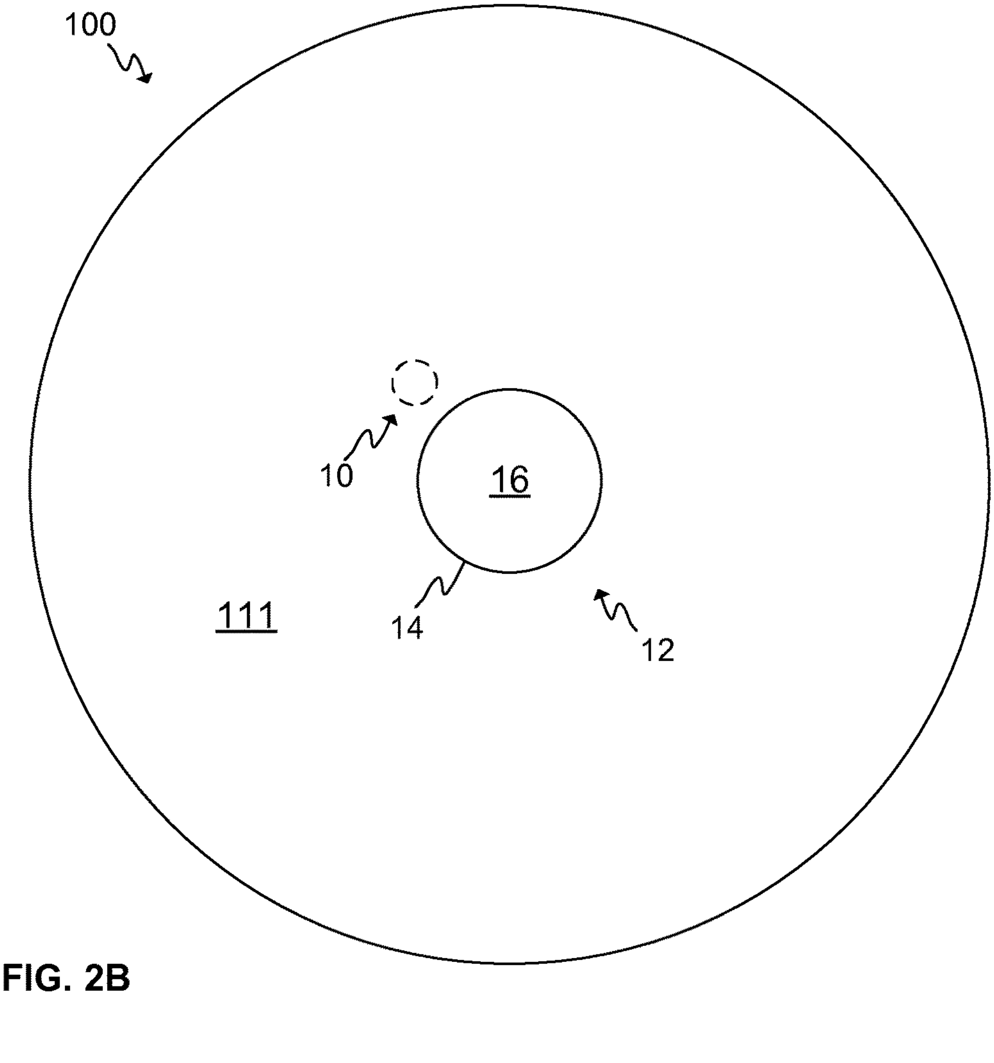

FIGS. 2A and 2B illustrate schematically a turbine wheel 100 according to an embodiment of the present invention. FIG. 2A illustrates the turbine wheel 100 as a cross-sectional side view. FIG. 2B illustrates the turbine wheel 100 from a first side 110, or below if looking at FIG. 2A. The turbine wheel 100 in FIGS. 2A and 2B is essentially similar to one illustrated in FIGS. 1A and 1B, however, the turbine wheel 100 may further comprise a shaft portion 16 arranged to the shaft position 12 to extend from the turbine wheel 100 in the direction of the rotation axis 5. The shaft portion 16 may be an integrated part of the wheel 100 or may be attached, for example, by welding or by a screw or by a bolt 25 (like in FIGS. 4A and 4B). The shaft portion 16 may be adapted such that the shaft or axis may be conveniently attached to the shaft portion 16. The shaft portion 16 may comprise a side surface 17 (extending mostly away from the second side 120 in the direction of the rotation axis 5, except at optional more complex shapes on the outer surface of the shaft portion 16, if any) and the shaft position 12. In this case too, the shape of the fluid channel 15, as is visible in FIG. 2A, may conform with the shape of the edge of the blades. The fluid channel 15 may, thus, comprise at least one curved portion, preferably, in the intermediate portion 118 of the wheel 100.

According to some embodiments, the shaft portion 16 may be the portion of the shaft or axis which reside in a space, a gap or a volume at the first side 110 essentially defined by the turbine wheel and a body part of the turbine, such as a gas turbine. The space, gap or volume enables the rotation of the turbine wheel 100 with respect to the body part. The size of said space may depend on the size of the turbine wheel 100 and/or the amount of cooling fluid to be injected into the wheel 100. According to an embodiment, the size, that is the distance between the turbine wheel 100 from the body part, such as between the first surface 111 and the body part, may range from six millimeters to 12 millimeters, for instance.

Referring to the unalignment of the first opening 10 with respect to the shaft position 12 or the shaft area 14, in various embodiments the first opening 10 may be arranged at the side of the shaft portion 16 to extend along the side of shaft portion 16, in which case the distance 11 may be regarded as a small, however, finite distance being higher than zero, and, therefore, not overlapping with the shaft position 12 or the shaft area 14. This is further illustrated in FIG. 7.

Figure 3A:
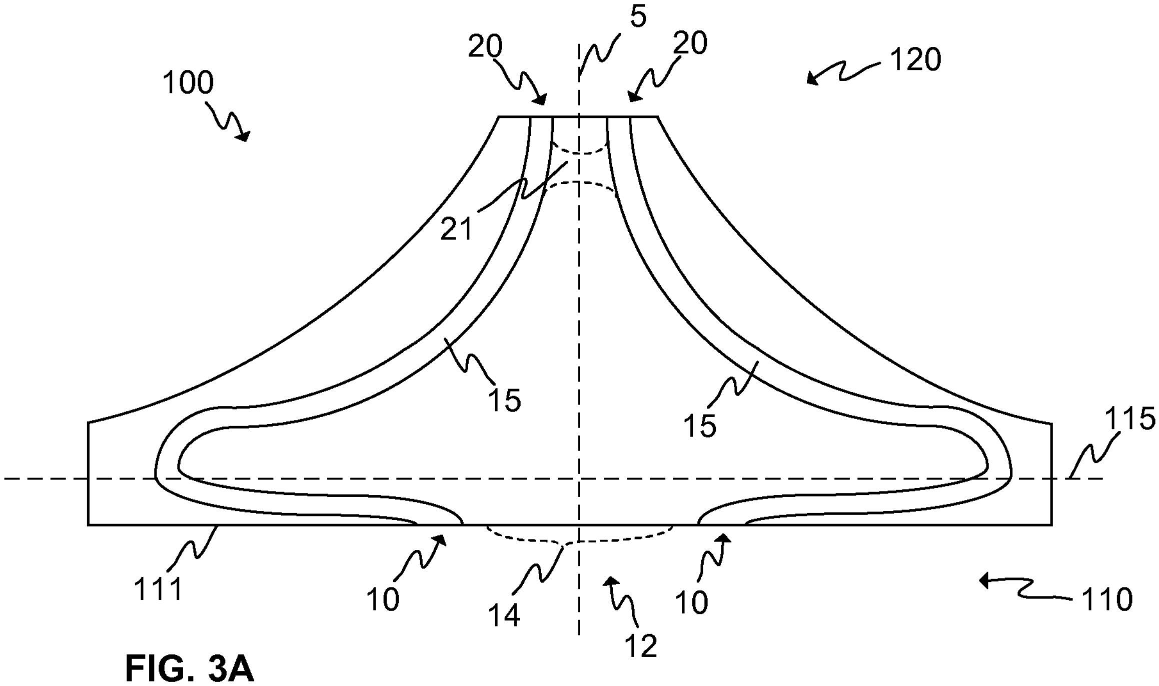
FIGS. 3A and 3B illustrate schematically a turbine wheel according to an embodiment of the present invention.
Figure 3B:
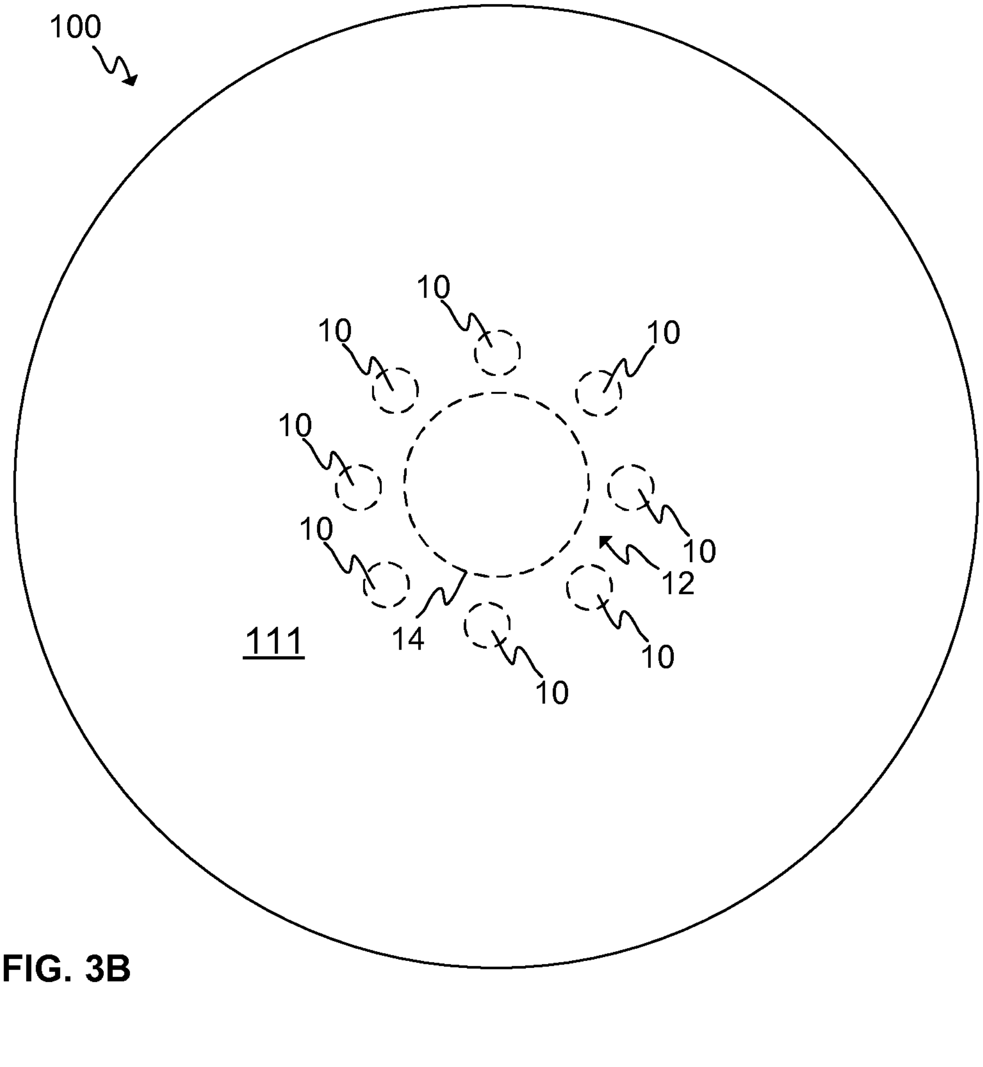

FIGS. 3A and 3B illustrate schematically a turbine wheel 100 according to an embodiment of the present invention. FIG. 3A illustrates the turbine wheel 100 as a cross-sectional side view. FIG. 3B illustrates the turbine wheel 100 from a first side 110, or below if looking at FIG. 3A. The turbine wheel 100 in FIGS. 3A and 3B is essentially similar to one illustrated in FIGS. 1A and 1B, however, the turbine wheel 100 may comprise a plurality of first openings 10 at the first side 110, each one of which being in fluid communication with at least one of the number of second openings 20. FIG. 3A illustrates two first openings 10 and two second openings 20, and fluid channels 15 extending between the first 10 and the second openings 20. Still further, FIG. 3A illustrates with dashed lines near the second openings 20 that the fluid channels 15 may be in connection with each other, or share a common channel 21 or a common volume 21, within the turbine wheel 100.

According to an embodiment, the plurality of first openings 10, such as two, four, or ten or twenty, may be arranged evenly around the shaft position 12 for providing cooling fluid, and thus cooling, more evenly into the turbine wheel 100.

Figure 4A:
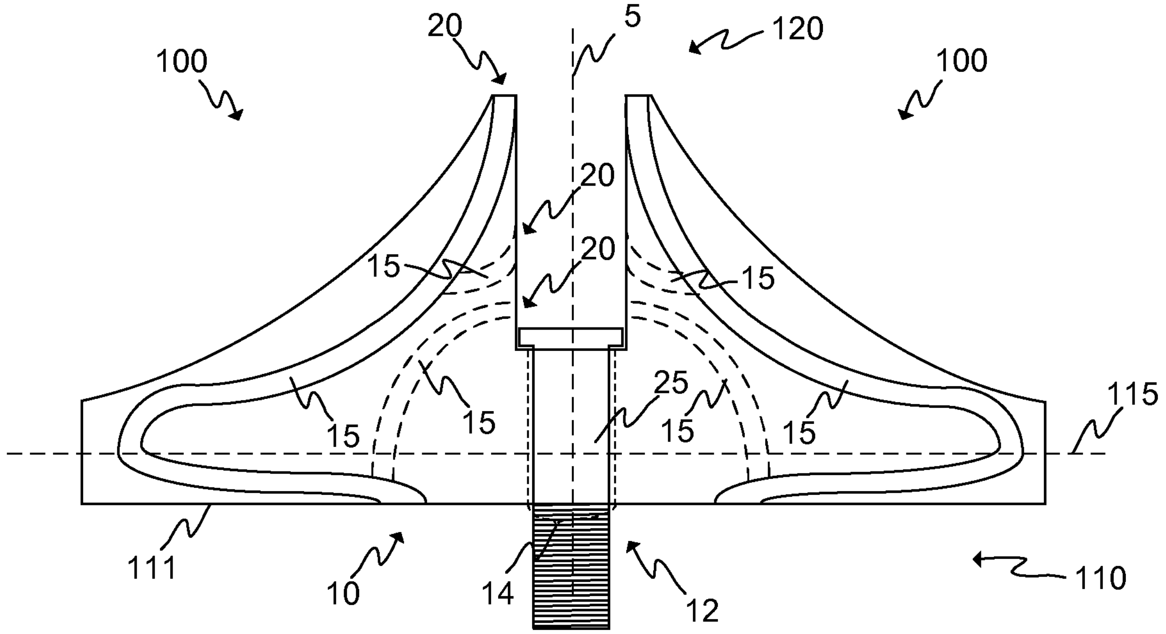
FIGS. 4A and 4B illustrate schematically turbine wheels according to some embodiments of the present invention.
Figure 4B:
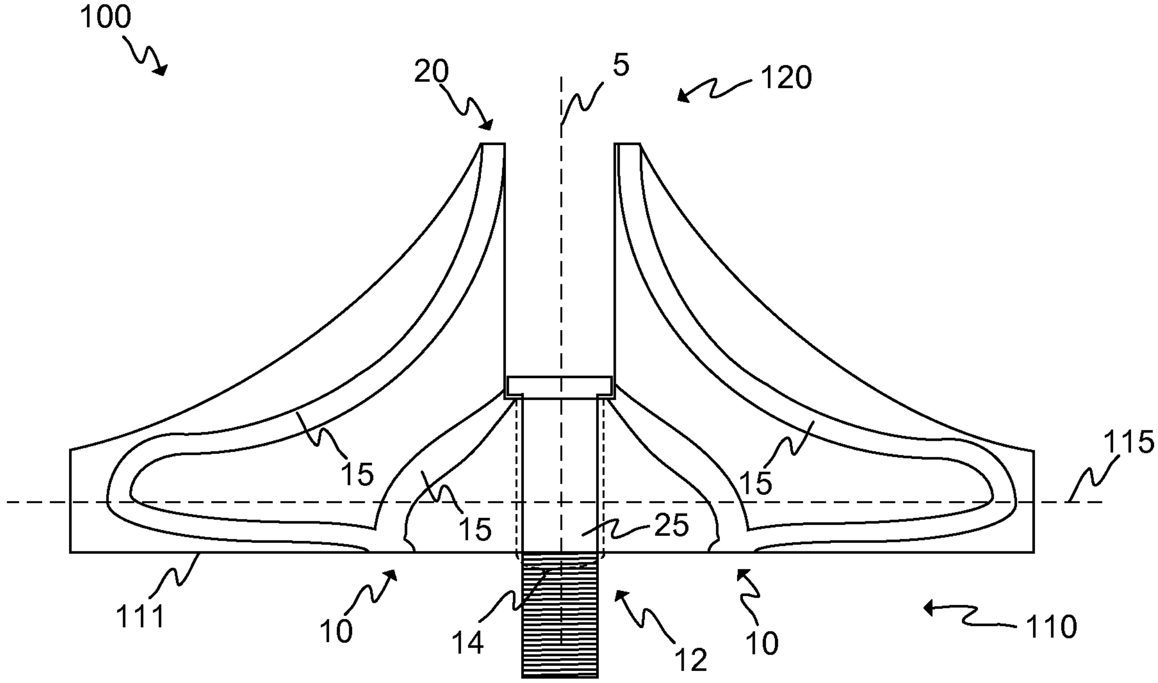

FIGS. 4A and 4B illustrate schematically turbine wheels 100 according to some embodiments of the present invention. The turbine wheels 100 in FIGS. 4A and 4B comprise a through-hole along the rotation axis 5. The through-hole 5 may preferably be adapted for receiving a bolt 25 for attaching the turbine wheel 100 to a shaft of the turbine. In some embodiments, at least one second opening 20 may be arranged to a wall of the through-hole, such as illustrated in FIG. 4A. According to an embodiment illustrated in FIG. 4B, at least one second opening 20 may be arranged such that cooling for the bolt 25 may be provided through the fluid channel 15.

It has been illustrated in FIGS. 1A-4B that the first opening 10 or openings 10 may be arranged to the first side 110 of the wheel 100, the first side 110 being the inlet side of the turbine wheel 100, that is exhibiting higher air or gas pressure in use with respect to the opposite outlet side of the wheel 100.

Figure 5:
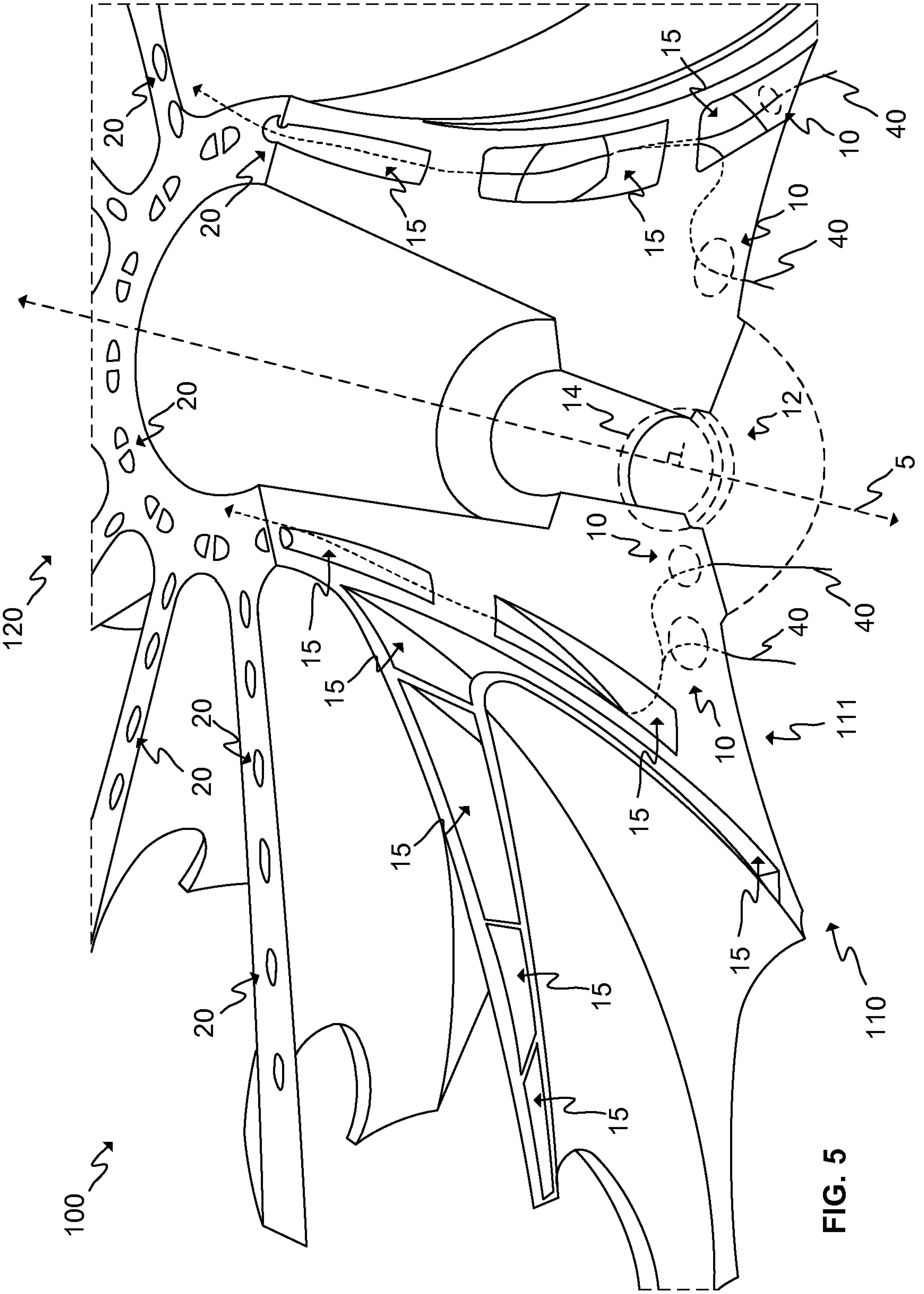
FIG. 5 illustrates schematically a portion of a turbine wheel according to an embodiment of the present invention.

FIG. 5 illustrates schematically a portion of a turbine wheel 100 according to an embodiment of the present invention. The turbine wheel 100 is illustrated as a cross-sectional view, or a cut-open view, from a perspective from the second side 120. As can be seen, the turbine wheel 100 comprises second openings 20 arranged close to the rotation axis 5 as well as to the blades of the turbine wheel 100. The turbine wheel 100 may essentially be arranged hollow defining a plurality of fluid channels 15 throughout the wheel 100. The first opening 10 or openings 10 may, preferably, be arranged close to the shaft position 12 or the shaft area 14, however, they may also or alternatively be arranged the blades or at least to align with the blades. The blades may have various shapes and/or dimensions, and are not restricted to any particular type of blade. In FIG. 5, examples of the cooling fluid 40 flow in the fluid channels 15 are demonstrated, which may comprise at least one curved portion, if not being entirely curved. As can be seen, in the embodiment of FIG. 5, the second openings 20 at the second side 120 are arranged at the trailing edge of the turbine wheel 100.

Figure 6A:
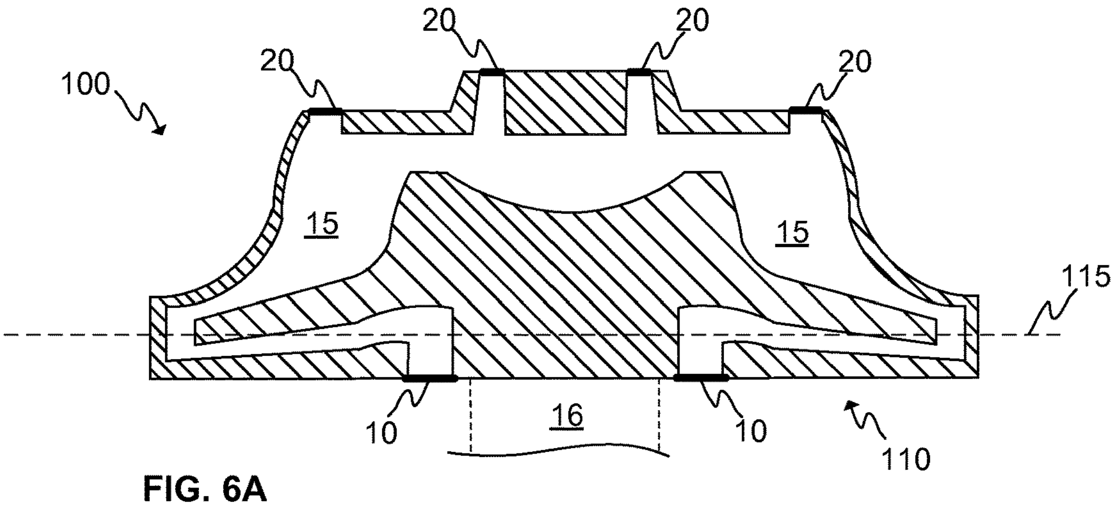
FIGS. 6A and 6B illustrate schematically turbine wheels according to some embodiments of the present invention.
Figure 6B:
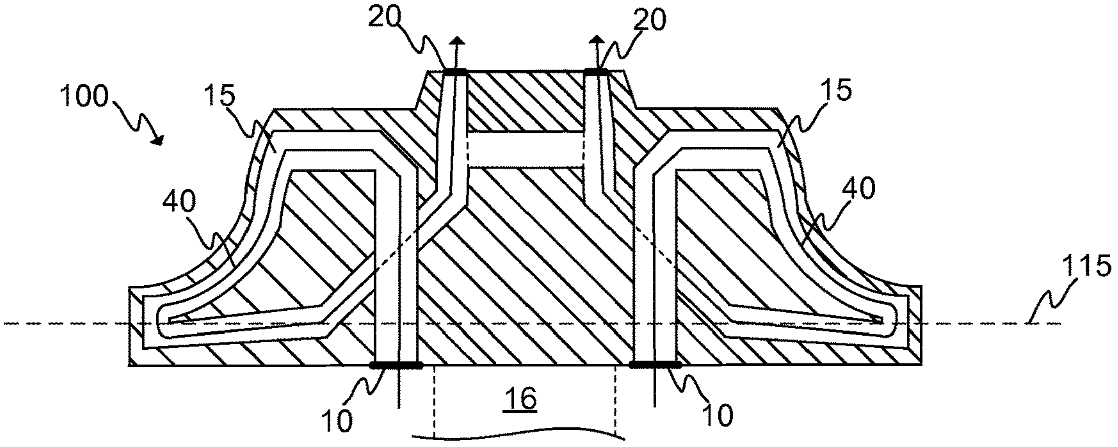

FIGS. 6A and 6B illustrate schematically turbine wheels 100 according to some embodiments of the present invention. The turbine wheels 100 in FIGS. 6A and 6B are illustrated as cross-sectional side views. In FIG. 6A, there are two first openings 10 arranged at the first side 110 to the first surface 111. The first openings are in fluid communication through the fluid channels 15 to the second openings 20. There are four second openings 20 being arranged at the second side 120 of the wheel 100. The outer second openings 20 may be so called trailing edge openings or holes through which the cooling fluid flown along the blades may exit the wheel 100. The inner second openings 20 may be so called hub openings or holes. The inner second openings 20 are radially closer to the rotation axis 5 with respect to the outer second openings 20.

FIGS. 6A and 6B illustrate that the fluid channel 15 may comprise, in addition to one or more curved portions, straight portions, such as at the openings 10, 20 of the fluid channel 15 and/or at the position of the division line 115 (or division plane 115) of the wheel 100.

FIG. 6B illustrates another embodiment in which the fluid channel 15 or channels 15 may be arranged such that the direction of the cooling fluid flow is essentially reversed with respect to the direction of the rotation axis 5. In this way, for example, the cooling fluid may be introduced, and thus provide cooling, to a certain part close to the outlet side of the wheel 100 more efficiently when the cooling fluid has still relatively low temperature when compared to the case in which the cooling fluid has already flown along the blade for some distance. The arrows of the cooling fluid flow 40 illustrate an example of the direction of the flow 40.

Figure 7:
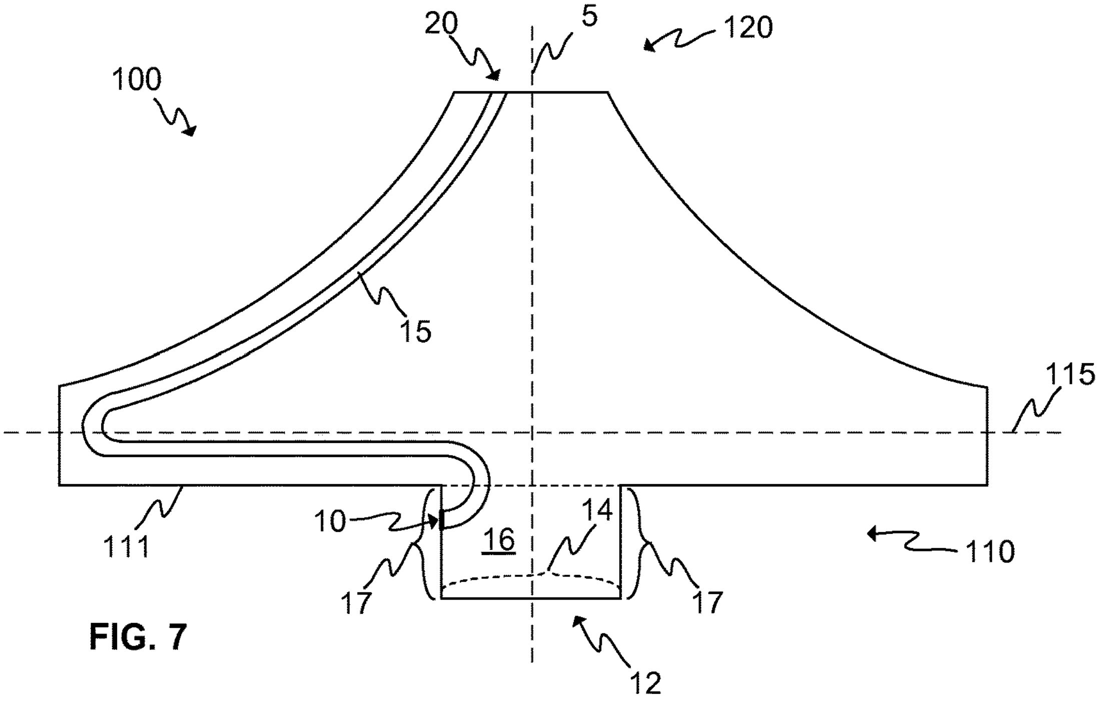
FIG. 7 illustrates schematically a turbine wheel according to an embodiment of the present invention.

FIG. 7 illustrates schematically a turbine wheel 100 according to an embodiment of the present invention. The first opening 10 may be arranged on the side surface 17 of the shaft portion 16. It is to be understood that the first opening 10 does not overlap with the shaft position 12 or the shaft area 14 in this case either. The first opening 10 is arranged between the shaft position 12 and the rest of the turbine wheel 100 in the direction of the rotation axis 5. According to various embodiments, the shaft portion 16 is to be resided in the space, gap or volume at the first side 110 essentially defined by the turbine wheel 100 and a body part of the turbine, such as a gas turbine (further illustrated in FIGS. 9-11, for instance).

FIG. 7 also illustrates that the fluid channel 15 may comprise, in addition to one or more curved portions, straight portions, such as at the first side 110 of the wheel 100.

The turbine wheel 100 according to various embodiments of the present invention may advantageously be manufactured by utilizing additive manufacturing (AM) methods, also referred to as 3D printing, especially metal 3D printing in many embodiments, such as selective laser melting (SLM). The turbine wheel 100 may be manufactured utilizing a powder bed including layers of metal powder spread across an inert build area under vacuum. The desired geometry of the turbine wheel 100 may then be manufactured by utilizing a laser, such as a Ytterbium laser, on the metal powder. However, as discussed hereinbefore, in some embodiments, subtractive methods including, for example, milling and drilling may be utilized, such as to shape the wheel and/or to provide the fluid communication or the fluid channel(s).

According to various embodiments of the present invention, a gas turbine 200 may comprise a turbine wheel 100 according to various embodiments described hereinbefore. The gas turbine 200 may further comprise at least one second fluid channel arranged for providing cooling fluid to be supplied to the first opening 10 or openings 10 from a fluid source, such as a compressor. The cooling fluid may, preferably be arranged to such a pressure that it flows into the first opening 10 or openings 10.

Figure 8A:
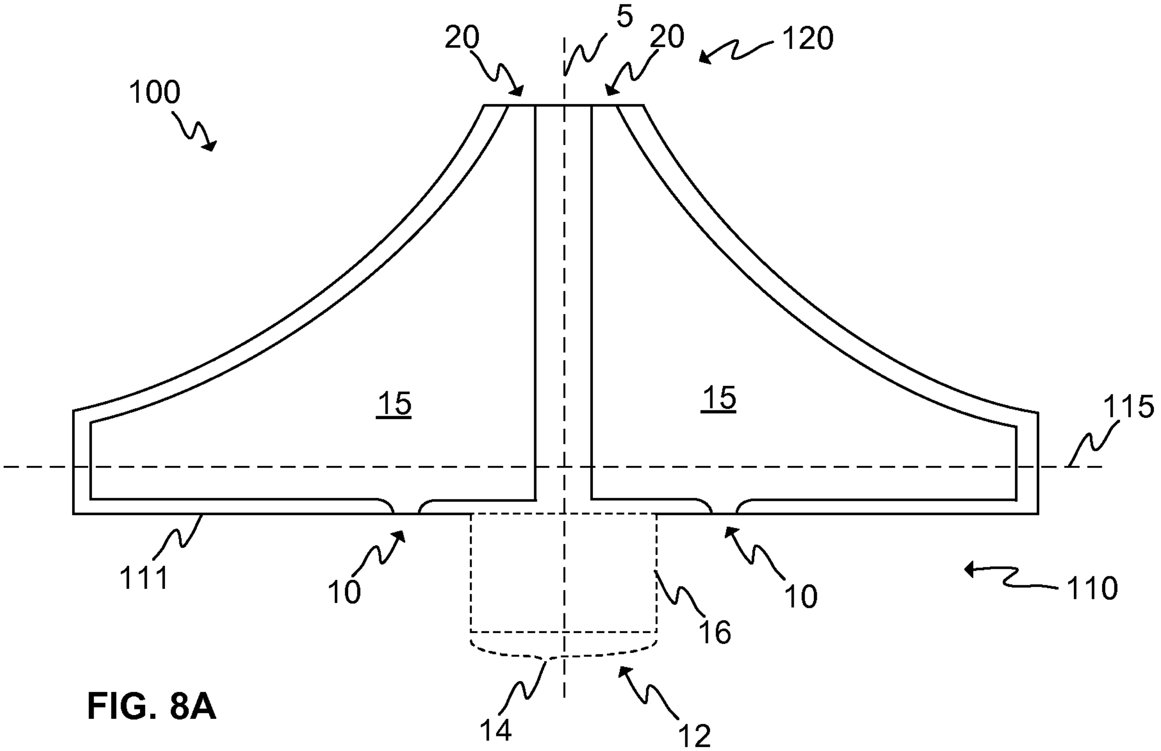
FIGS. 8A and 8B illustrate schematically turbine wheels according to some embodiments of the present invention.
Figure 8B:
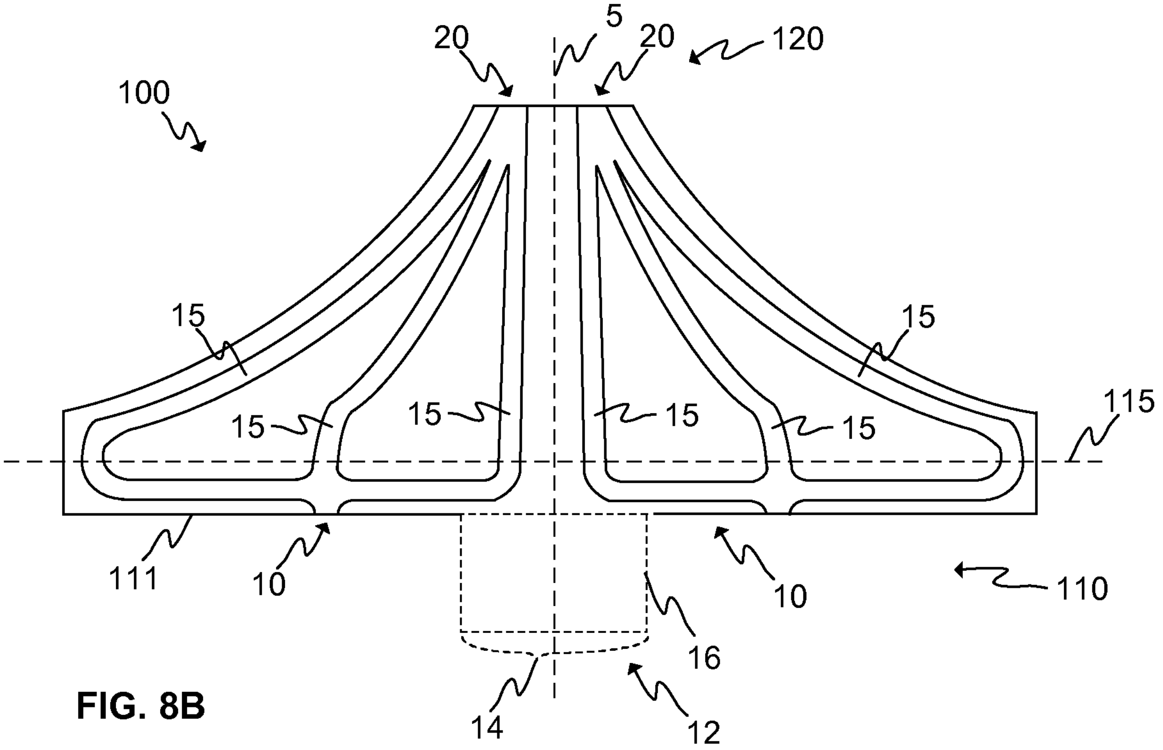

FIGS. 8A and 8B illustrate schematically turbine wheels 100 according to some embodiments of the present invention. FIGS. 8A and 8B illustrate the turbine wheels 100 as a cross-sectional side view. The shaft portion 16 has been illustrated as an optional feature which may or may not be arranged to the wheel 100. The turbine wheels 100 in FIGS. 8A and 8B are essentially similar to one illustrated in FIGS. 1A and 1B, however, the fluid communication 15 or the fluid channel 15 arranged between the first opening or openings 10 and the second openings or openings 20 is a space arranged into the turbine wheel 100. As an example, the turbine wheel 100 may be substantially hollow, and at least one first opening 10 and at least one second opening 20 have been arranged to be in fluid communication with said space. FIG. 8B illustrates a turbine wheel 100 in which there are several parallel channels or conduits extending between a first opening 10 and a second opening 20 for providing the fluid communication 15 or the fluid channel 15. The number of parallel channels may range from two to any number, such as from two to ten, for instance.

FIG. 8B also illustrates that the fluid channel 15 may comprise, in addition to one or more curved portions, straight portions, such as the lateral channel portion at the first side 110 and/or the portion substantially parallel relative to the axis 5 at the second side 120 of the wheel 100.

Figure 9:
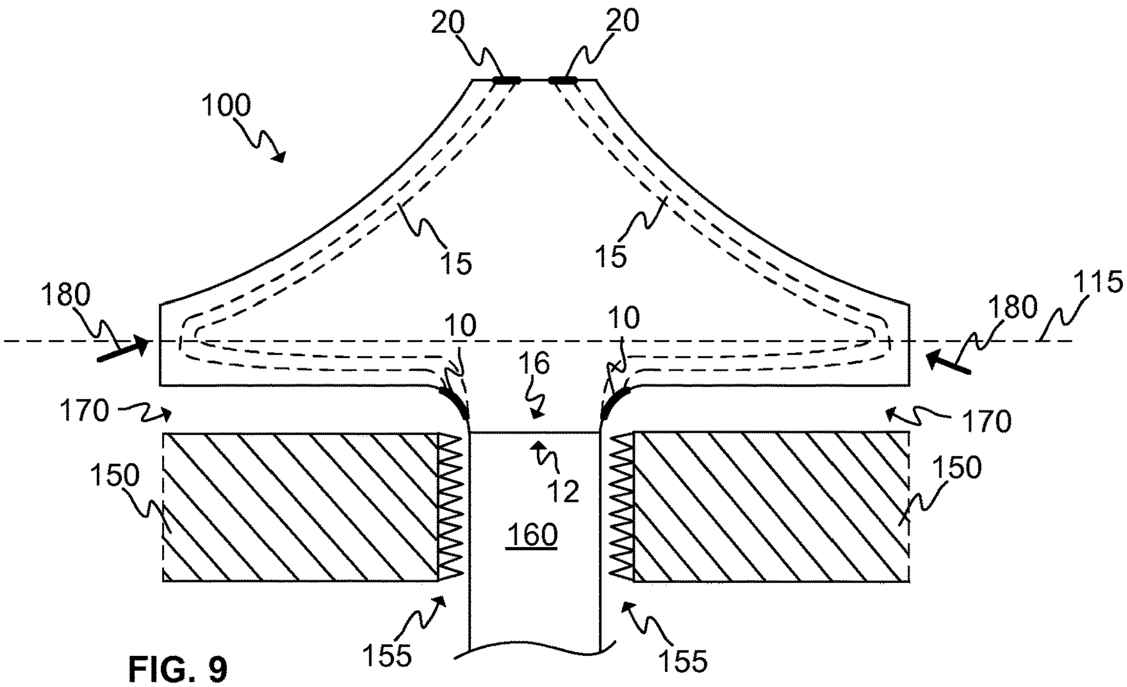
FIG. 9 illustrates schematically a portion of a gas turbine according to an embodiment of the present invention.

FIG. 9 illustrates schematically a portion of a gas turbine 200 according to an embodiment of the present invention. The gas turbine 200 may comprise the turbine wheel 100 comprising a number of fluid channels 15 arranged therewithin for cooling fluid. It is shown in FIG. 9 the direction of the flow of air or gas 180, that is the working fluid 180, of the gas turbine 200. The air or gas may, preferably, be arranged to flow from a combustion chamber or other such a heating element. The air or gas may exhibit high pressure and temperature, such as ranging from four to six bars and from 800 to 1400 degrees Celsius, respectively. The temperature may be, in some embodiments, in the range of 950 to 980 degrees Celsius. The air or gas may be injection into the combustion chamber from a compressor, thus exhibiting high pressure as compared to air pressure outside the turbine.

FIG. 9 further illustrates the space 170, gap 170 or volume 170 at the first side 110 defined by the turbine wheel 100 and a body part 150 of the turbine 200. Particularly, the space 170 may be defined by the first surface 111 and a side of the shaft portion 16. As can be seen in FIG. 9, the first opening 10 has been arranged to the corner between the first surface 111 and the side of the shaft portion 16. Thus, the first opening 10 does not overlap with the shaft position 12 according to the present invention. The first opening 10 may regarded herein to reside aligned or right next to the edge of the shaft position 12, however, not overlapping with the shaft position 12 or the shaft area 14.

Still further, the gas turbine 200 may comprise a shaft 160 or an axis 160 to which the turbine wheel 100 may be arranged to in fixed manner, such as attached or as integrated. The shaft 160 may, preferably, be arranged to rotate with respect to the body part 150, that is the turbine backplate, of the turbine 200. There may be a sealing 155, such as a labyrinth seal, being arranged between the body part 150 and the shaft 160 for restricting, minimizing or controlling the amount of air or gas flown between the body part 150 and the shaft 160. The sealing 155 may be attached to the surfaces of the body part 150 facing the shaft 160.

Figure 10A:
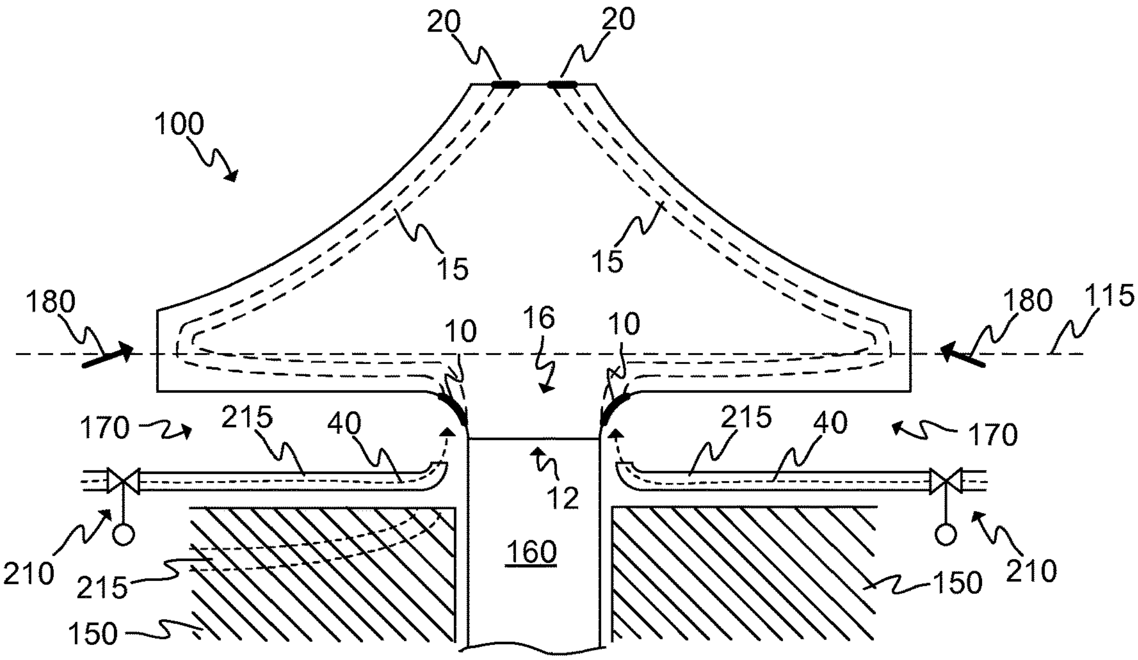
FIGS. 10A and 10B illustrate schematically second fluid channels according to some embodiments of the present invention.
Figure 10B:
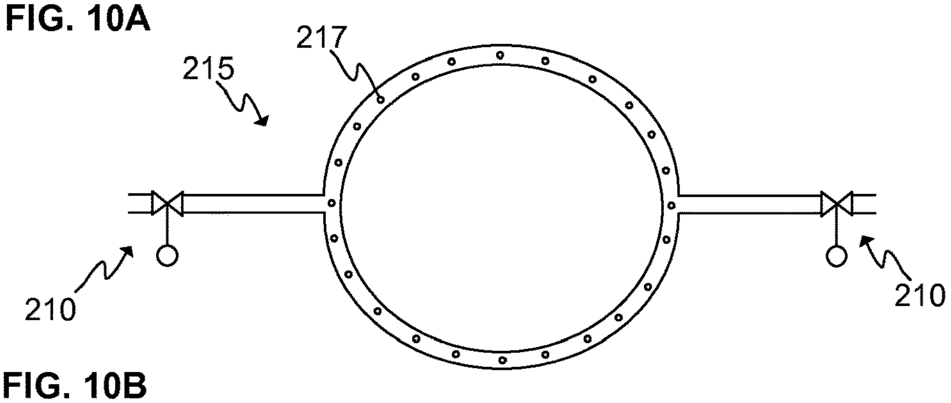

FIGS. 10A and 10B illustrate schematically second fluid channels 215 according to some embodiments of the present invention. The gas turbine 200 may further comprise a second fluid channel 215 or channels 215, such as shown in FIGS. 10A and 10B, for providing or directing cooling fluid 40, such as air, to the first opening 10 or openings 10, or at least into the space 170, preferably, near said opening 10 or openings 10. In some embodiments, the second fluid channel 215 may be integrated with the body part 150 of the turbine. The second fluid channel 215 may, as shown in FIG. 10A with dashed lines, be arranged to extend within the body part 215. The second channel 215 or channels 215 may preferably comprise a control valve 210 or valves 210 for controlling the flowing of the cooling fluid 40, such as turning it on, off, or restricting it. The second channel 215 or channels 215 may preferably be fixed with respect to the body part 150 of the turbine 200. The cooling fluid 40 may be provided into the second fluid channel 215 or channels 215 by a pressure increasing device, such as a separate compressor, or a by a compressor of the gas turbine 200. In one embodiment, the cooling fluid 40 may be provided from the compressor of the turbine and the pressure may then be further increased by a pressure increasing device.

The flow of the cooling fluid may be controlled, for example, based on a determined, such as directly measured, or indirectly estimated (such as by a mathematical model or an algorithm executed by a processing unit, such as of a controller of the gas turbine) inlet temperature of the turbine wheel. In some cases, the flow of cooling fluid may even be stopped, if the inlet temperature of the turbine or turbines (high and low pressure) is lower than an inlet temperature threshold value(s).

FIG. 10B illustrates a second fluid channel 215 according to an embodiment comprising a nozzle part which may be arranged around the shaft 160 or the shaft portion 16, such as substantially round-shaped nozzle part. The nozzle part may comprise a plurality of openings 217 for injecting the cooling fluid 40 evenly into the space 170. The openings 217 may be arranged in the corresponding positions with respect to first openings 10. Furthermore, the nozzle part may be arranged be as close to the first openings 10 as possible for enabling the entering of the cooling fluid 40 into the turbine wheel 100. Thus, the openings 217 may also be evenly distributed so as to be evenly around the shaft position 12.

Figure 11:
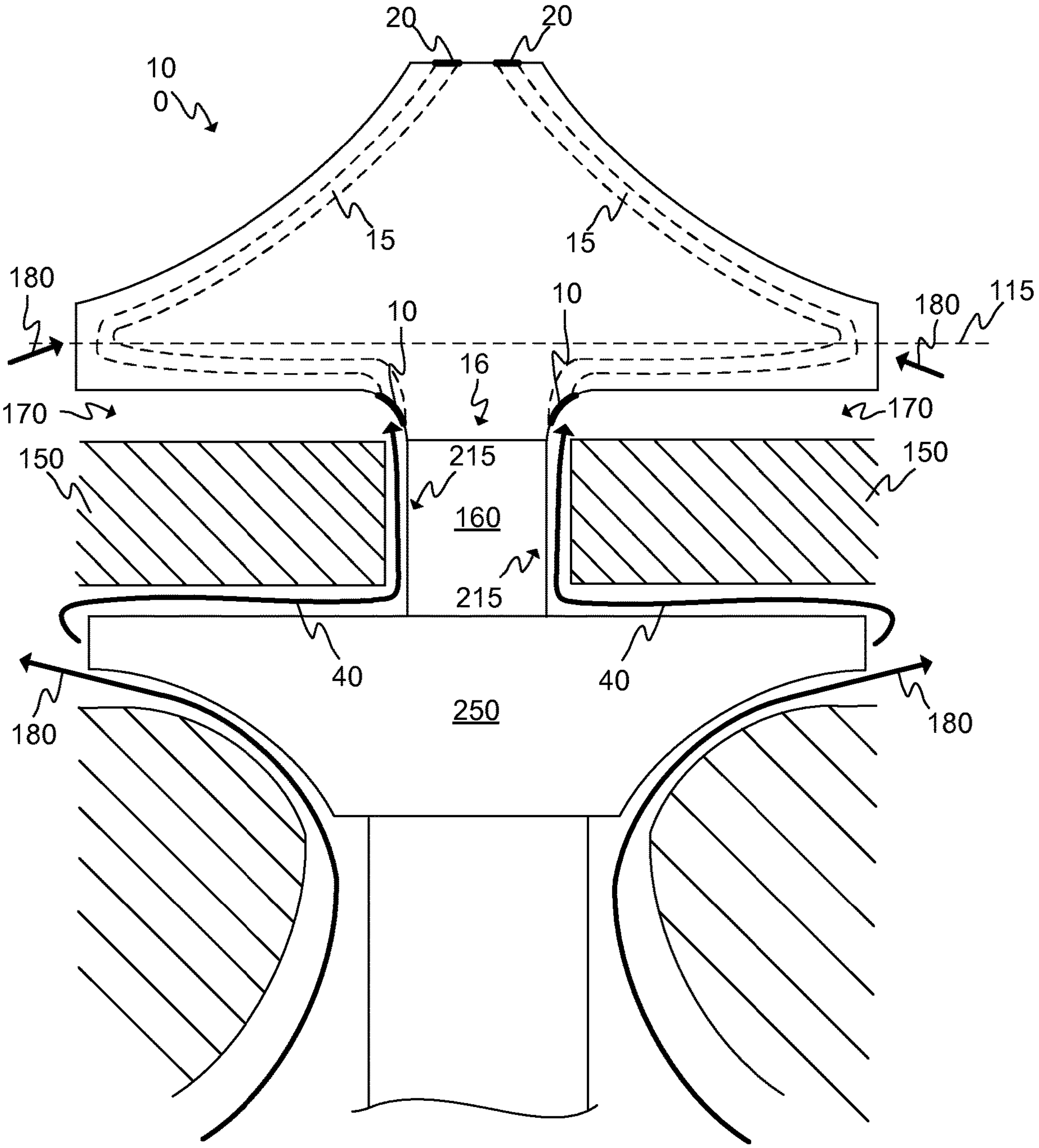
FIG. 11 illustrates schematically a second fluid channel according to an embodiment of the present invention.

FIG. 11 illustrates schematically a second fluid channel 215 according to an embodiment of the present invention. FIG. 11 illustrates a turbine wheel 100 and a compressor 250 of a gas turbine 200 arranged on the same shaft 160. The second fluid channel 215 may be arranged to a space or volume, that is to a second space, between the body part 150 and the shaft 160. In other words, the second space provides a leakage path for the cooling fluid 40 from the compressor 250. Thus, an end of the second fluid channel 215 may be arranged to the space 170 at the first side 110 of the turbine wheel 200. There may or may not be a sealing 155, such as a labyrinth seal, arranged into the second space. According to some embodiments, the labyrinth seal may be, at least during the times when the shaft 160 is not being rotated, adjusted to change the amount of cooling fluid 40 flow in the second fluid channel 215.

Figure 12A:
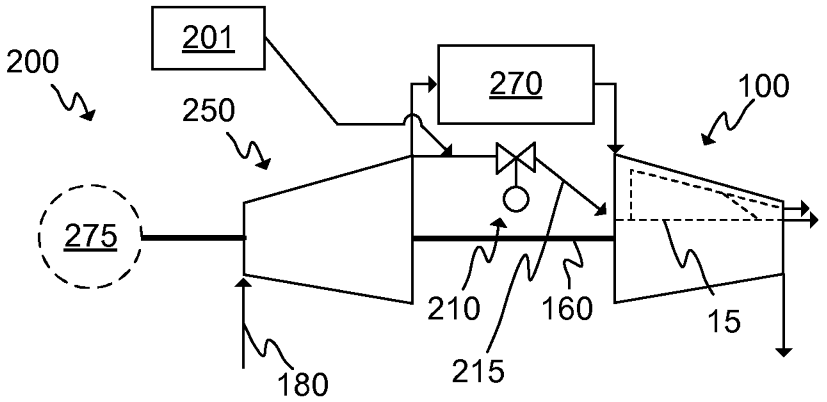
FIGS. 12A and 12B illustrate schematically gas turbines according to some embodiments of the present invention.

FIG. 12A illustrates schematically a gas turbine 200 according to an embodiment of the present invention. The gas turbine 200 may comprise a single spool comprising a compressor wheel 250 and a turbine wheel 100 according to some embodiment of the present invention. The compressor wheel 250 and the turbine wheel 100 may be arranged on the same shaft 160. Furthermore, there may optionally be an electrical generator/motor 275 being coupled to the shaft 160, preferably, directly, or through a gear. The air or gas 180, or the working fluid 180, may be arranged go or fed into the inlet of the compressor 250 for increasing the pressure thereof. The working fluid 180 may then be arranged to exit the compressor 250 from its outlet and be fed into a combustion chamber 270 or the like for increasing the temperature of the working fluid 180. From the combustion chamber 270, the working fluid 180 may be arranged to enter the turbine, and to become in contact with the blades of the turbine wheel 100 thereof and, therefore, to rotate the turbine wheel 100. The working fluid 180 then exits the turbine from its outlet. The basic operation of the gas turbine 200 is similar to known gas turbines and is, thus, familiar to a person skilled in the art.

However, the gas turbine 200 may further comprise a fluid source 201, 250, particularly a cooling fluid source 201, 250. The fluid source 201, 250 may be an external fluid source 201, such as an external compressor, or the compressor 250 of the gas turbine 200. There may also be the second fluid channel 215, with or without a control valve 210, arranged between the fluid source 201 and the turbine wheel 100, specifically the space 170 at the first side 110 of the turbine wheel 100. The cooling fluid 40 may advantageously be taken from the outlet of the compressor 250 and fed into the turbine wheel 100, for example, in accordance with FIG. 8A or FIG. 9, or in some other way not explicitly mentioned herein.

Figure 12B:
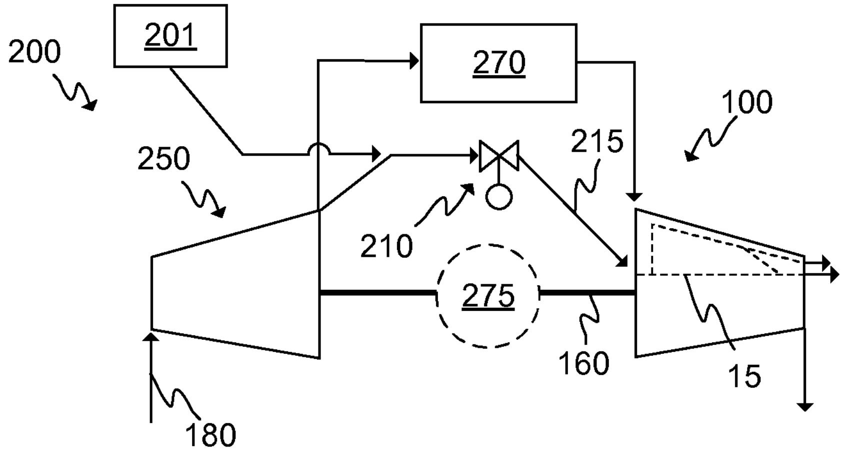

FIG. 12B illustrates similar kind of a gas turbine 200 as FIG. 12A, however, the generator/motor, if any, may be arranged specifically between the compressor 250 and the turbine wheel 100.

Figure 13:
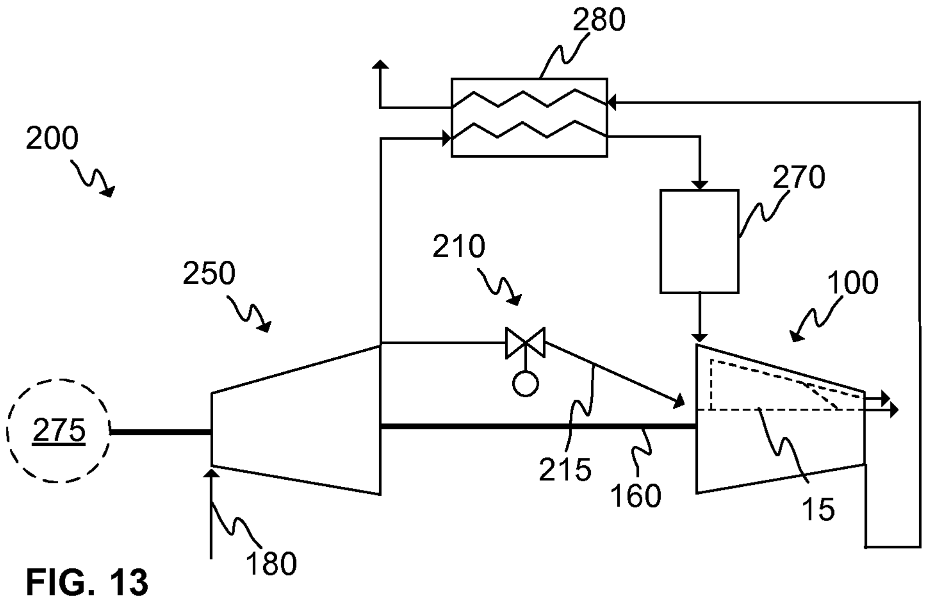
FIG. 13 illustrates schematically a gas turbine according to an embodiment of the present invention.

FIG. 13 illustrates schematically a gas turbine 200 according to an embodiment of the present invention. The gas turbine 200 in FIG. 13 may be similar to one in FIG. 12A, however, it may further comprise a first heat exchanger 280, that is a recuperator, arranged to pre-heat the working fluid 180 before entering into the combustion chamber 270. The first heat exchanger 280 may be any of known kinds of heat exchangers that is suitable for the gas turbine 200 in question. The working fluid 180 may exit the gas turbine 200 as exhaust gas after the turbine or be fed into the first heat exchanger 280, if any. In this case too, the generator/motor, if any, may alternatively be arranged between the compressor 250 and the turbine wheel 100.

Figure 14:
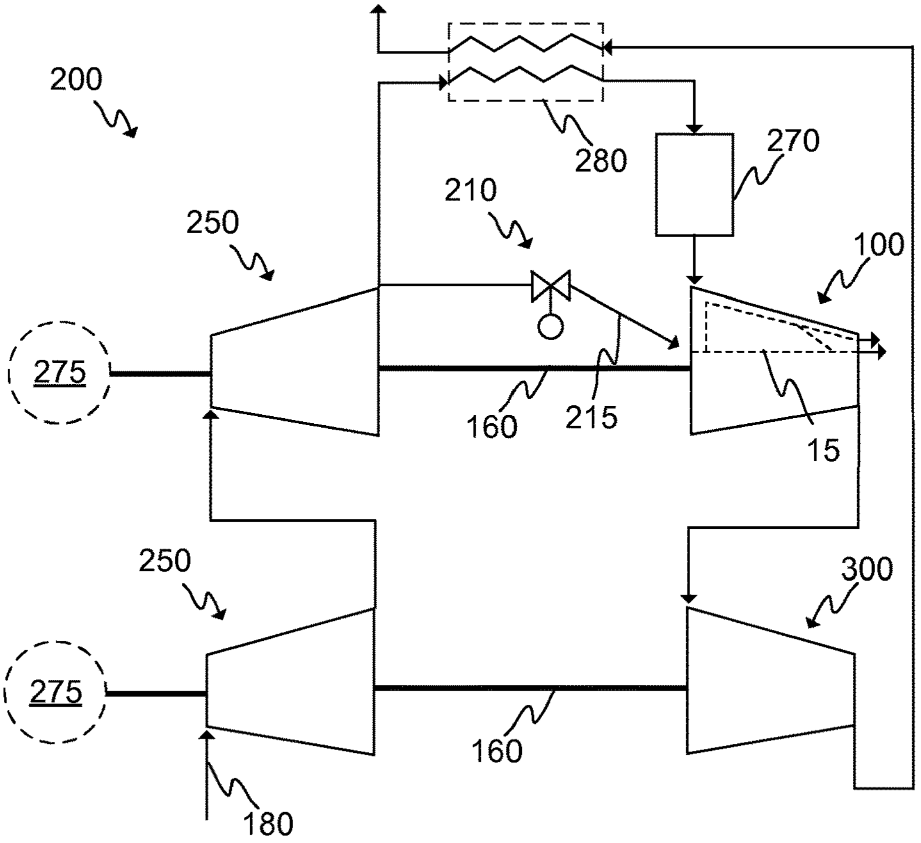
FIG. 14 illustrates schematically a gas turbine according to an embodiment of the present invention.

FIG. 14 illustrates schematically a gas turbine 200 according to an embodiment of the present invention. FIG. 14 illustrates a two-spool gas turbine 200, the high-pressure spool of which comprises a turbine wheel 100 according to some embodiment of the present invention. The basic operation of the two-spool gas turbine is familiar to a person skilled in the art. The working fluid is first directed to the low-pressure compressor 250, after which it is being fed, directly or through an intermediate cooler, to the high-pressure compressor 250. After the high-pressure compressor 250, the working fluid 180 is being fed either directly or through the first heat exchanger 280 to the combustion chamber 270 or the like. The working fluid 180 exits the combustion chamber 270 having an elevated temperature, such as 850-1500 degrees Celsius, for instance, and may be fed into the high-pressure turbine, particularly to rotate the turbine wheel 100 thereof. The temperature may be a bit higher than at the inlet of the turbine. After that the working fluid 180 may be fed either directly or through a reheating device, such as a second combustion chamber, to the inlet of the low-pressure turbine 300. The working fluid 180 may then exit the gas turbine 200 as exhaust gas or be fed into the first heat exchanger 280, if any. In this case too, the generator/motor, if any, may alternatively be arranged between the compressors 250 and the turbine wheels 100 at least of one spool.

Figure 15:
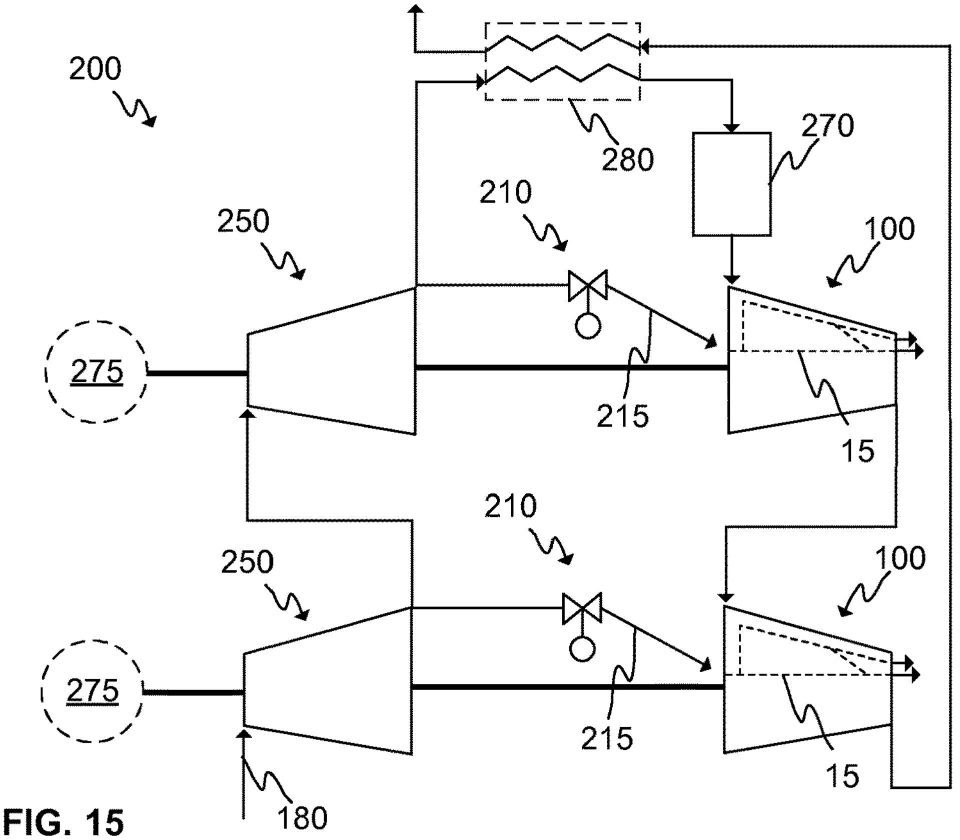
FIG. 15 illustrates schematically a gas turbine according to an embodiment of the present invention.

FIG. 15 illustrates schematically a gas turbine 200 according to an embodiment of the present invention. The gas turbine 200 may be similar to one in FIG. 14, however, in this case both the low-pressure turbine and the high-pressure turbine comprise turbine wheels 100 according to some embodiment of the present invention.

Figure 16:
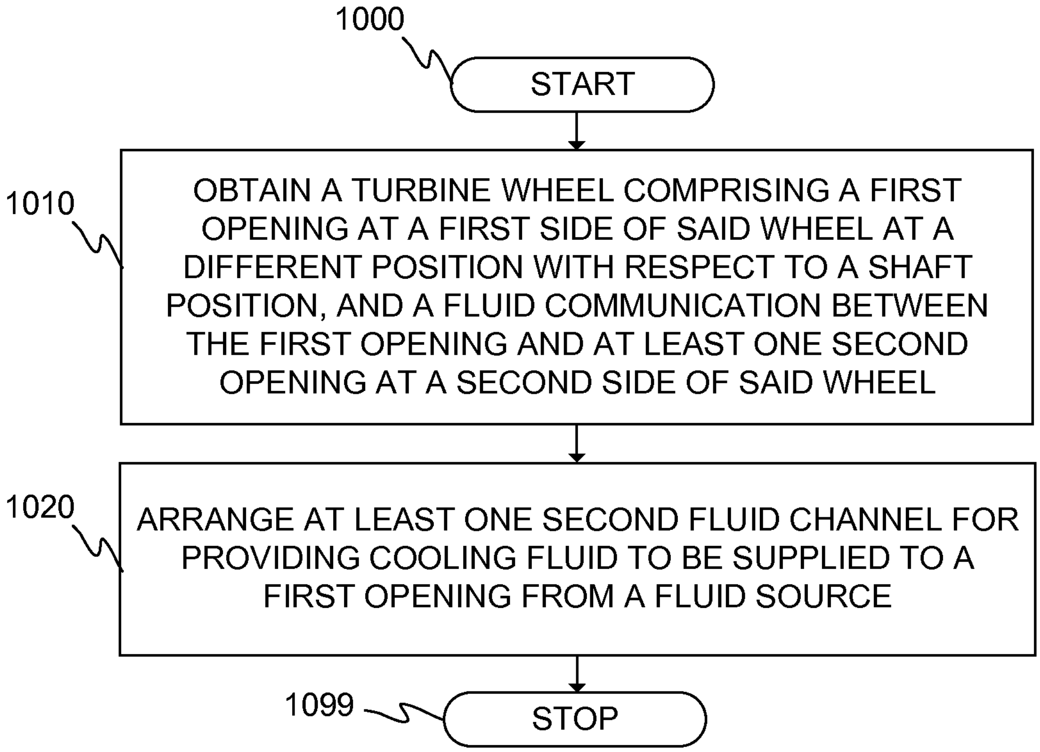
FIG. 16 illustrates a flow diagram of a method according to an embodiment of the present invention.

FIG. 16 illustrates a flow diagram of a method according to an embodiment of the present invention.

Step 1000 refers to a start-up phase of the method. Suitable equipment and components are obtained, and systems assembled and configured for operation.

Step 1010 refers to obtaining a turbine wheel 100 having a rotation axis 5, a first side 110 and a second side 120, said sides 110, 120 being opposite sides in a direction of the rotation axis 5, and comprising a first opening 10 at the first side 110, a number of second openings 20 and a fluid channel 15 extending between the first opening 10 and at least one of the number of second openings 20, and a shaft position 12 at the first side 110, the first opening 10 being arranged to a different position with respect to the shaft position 12.

In preferable embodiments, the fluid channel 15 comprises at least one curved portion. In addition, optionally, the curved portion has a shape that conforms with a shape of an edge of a blade of the turbine wheel 100.

Step 1020 refers to arranging at least one second fluid channel 215 for providing cooling fluid 40 to be supplied to a first opening 10 or openings 10 from a fluid source 201, 250.

According to an embodiment, the fluid source may be an external compressor 201. According to another embodiment, the fluid source may be the compressor 250 of the gas turbine 200.

Method execution is stopped at step 1099.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A gas turbine comprising a turbine wheel having a rotation axis, a first side and a second side, said sides being opposite sides in a direction of the rotation axis, wherein the turbine wheel comprises a plurality of first openings at the first side and a number of second openings at the second side, wherein each one of the first openings is in a fluid communication, via at least one fluid channel, with at least one of the number of second openings, wherein the at least one fluid channel comprises at least one curved portion, and a shaft position at the first side for attaching a shaft, wherein the first openings are arranged to a different position with respect to the shaft position;

the gas turbine further comprising at least one second fluid channel arranged for providing cooling fluid to be supplied to the first openings from a fluid source, the gas turbine comprises a controllable valve in the second fluid channel for controlling a flow of the cooling fluid, an end of the second fluid channel is arranged to a space at the first side of the turbine wheel, the space being between the turbine wheel and a body part of the turbine, wherein the turbine wheel is configured to be rotated with respect to the body part, and wherein the first openings are arranged to face the space, and the at least one second fluid channel comprises a nozzle part, wherein the nozzle part comprises a plurality of third openings such that the plurality of third openings are arranged radially in the corresponding positions with respect to the first openings.

2. The gas turbine of claim 1, wherein the at least one curved portion has a shape that conforms with a shape of an edge of a blade of the turbine wheel.

3. The gas turbine according to claim 1, wherein the first openings are arranged unaligned with respect to the shaft position in the direction of the rotation axis.

4. The gas turbine according to claim 1, wherein the turbine wheel comprises a first surface at the first side being substantially perpendicular with respect to the rotation axis, wherein the first openings are arranged to the first surface.

5. The gas turbine according to claim 1, wherein the turbine wheel comprises a shaft portion extending in the direction of the rotation axis at the first side and away from the second side, the shaft portion defining a side surface and the shaft position.

6. The gas turbine according to claim 5, wherein the first openings are on the side surface of the shaft portion.

7. The gas turbine according to claim 5, wherein the nozzle part is arranged around the shaft portion.

8. The gas turbine according to claim 1, wherein the plurality of first openings are arranged evenly around the shaft position.

9. The gas turbine according to according to claim 1, wherein the fluid source is a compressor of the turbine.

10. The gas turbine according to claim 1, comprising a shaft arranged to the shaft position of the turbine wheel and a compressor arranged on the shaft, wherein the body part is arranged between the compressor and the turbine wheel, and the shaft is arranged to be rotated with respect to the body part, wherein the second fluid channel is arranged between the compressor and the space along a second space between the shaft and the body part.

11. The gas turbine according to claim 10, wherein the nozzle part is arranged around the shaft.

12. The gas turbine according to claim 1, wherein a second space comprises a sealing.

13. The gas turbine according to claim 1, wherein the flow of the cooling fluid is controlled, by the controllable valve, based on a determined inlet temperature of the turbine wheel.

14. A method for providing cooling to a turbine wheel of a gas turbine, the method comprising:

obtaining a turbine wheel having a rotation axis, a first side and a second side, said sides being opposite sides in a direction of the rotation axis, and comprising a plurality of first openings at the first side and a number of second openings at the second side, wherein the first openings are in a fluid communication, via at least one fluid channel, with at least one of the number of second openings, the at least one fluid channel comprising at least one curved portion, and a shaft position at the first side for attaching a shaft, the first openings being arranged to a different position with respect to the shaft position, and arranging at least one second fluid channel for providing cooling fluid to be supplied to the first openings from a fluid source, wherein the gas turbine comprises a controllable valve in the second fluid channel for controlling a flow of the cooling fluid, an end of the second fluid channel is arranged to a space at the first side of the turbine wheel, the space being between the turbine wheel and a body part of the turbine, wherein the turbine wheel is configured to be rotated with respect to the body part, and wherein the first openings are arranged to face the space, and the at least one second fluid channel comprises a nozzle part, wherein the nozzle part comprises a plurality of third openings such that the plurality of third openings are arranged in the corresponding positions with respect to first openings.

* * * * *